United States Patent
Seetharaman et al.

(10) Patent No.: US 8,571,040 B2
(45) Date of Patent: Oct. 29, 2013

(54) APPARATUS, METHOD, MANUFACTURE, AND SYSTEM FOR PROVIDING NETWORK SERVICES FROM BUILDING BLOCKS

(75) Inventors: Srinivasan Seetharaman, Mountain View, CA (US); Apurv Bhartia, Austin, TX (US); Sourabh Jain, Minneapolis, MN (US)

(73) Assignee: Deutsche Telekom AG, Bonn (DE)

( * ) Notice: Subject to any disclaimer, the term of this patent is extended or adjusted under 35 U.S.C. 154(b) by 684 days.

(21) Appl. No.: 12/714,766

(22) Filed: Mar. 1, 2010

(65) Prior Publication Data
US 2011/0211583 A1      Sep. 1, 2011

(51) Int. Cl.
H04L 5/12       (2006.01)
H04L 12/26      (2006.01)
H04L 12/28      (2006.01)
H04L 12/56      (2011.01)

(52) U.S. Cl.
USPC ........... 370/400; 370/251; 370/255; 370/351; 370/389; 370/392; 370/427

(58) Field of Classification Search
None
See application file for complete search history.

(56) References Cited

U.S. PATENT DOCUMENTS

| | | | |
|---|---|---|---|
| 4,782,517 A * | 11/1988 | Bernardis et al. | 379/201.05 |
| 5,907,607 A * | 5/1999 | Waters et al. | 379/201.03 |
| 6,330,586 B1 * | 12/2001 | Yates et al. | 709/201 |
| 6,425,005 B1 | 7/2002 | Dugan et al. | |
| 6,510,214 B1 * | 1/2003 | McDaniel | 379/134 |
| 7,061,923 B2 * | 6/2006 | Dugan et al. | 370/396 |
| 7,092,707 B2 * | 8/2006 | Lau et al. | 455/423 |
| 7,209,964 B2 * | 4/2007 | Dugan et al. | 709/223 |
| 2003/0079169 A1 * | 4/2003 | Ho et al. | 714/748 |
| 2005/0021713 A1 * | 1/2005 | Dugan et al. | 709/223 |
| 2011/0161911 A1 * | 6/2011 | Schultz et al. | 717/101 |

OTHER PUBLICATIONS

Barford et al., Design for Manageability in the Next Generation Internet, NeTS-FIND project, 2006.
Boneh et al., Designing Secure Networks from the Ground-up, NeTS-FIND project, 2006.
Greenberg et al. A Clean Slate 4D Approach to Network Control and Management. ACM CCR, 35(5), 2005.
Jannotti, Network Layer Support for Overlay Networks, PhD thesis, Massachusetts Institute of Technology, 2002.
McKeown et al., OpenFlow: Enabling Innovation in Campus Networks, Proceedings of the ACM Computer Communications Review, 38(2):69-74, Apr. 2008.

(Continued)

Primary Examiner — Hassan Phillips
Assistant Examiner — Lonnie Sweet
(74) Attorney, Agent, or Firm — Leydig, Voit & Mayer, Ltd.

(57) ABSTRACT

A method and apparatus for communicating over a network is provided. The method includes obtaining building block codes, where the building blocks codes are capable of being used together to provide an end-to-end service. The building block codes are sent to each appropriate building block controller, where each building block controller is associated with a corresponding network node. Upon receiving a first packet of a connection for the first end-to-end service, a determination as to which network nodes of the plurality of network nodes should be used as network hops for the connection, and as to, for each network node that should be used as a network hop for the connection, which building block codes should be used by the building block controller corresponding to the network node. These determinations are communicated to each of the appropriate building block controllers.

20 Claims, 6 Drawing Sheets

(56) References Cited

OTHER PUBLICATIONS

NOX—An OpenFlow Controller, http://noxrepo.org, Year:2008.

Ratnasamy et al., Towards an Evolvable Internet Architecture, Proceedings of ACM SIGCOMM, pp. 313-324, 2005.

Sherwood et al., Carving Research Slices out of Your Production Networks with OpenFlow, Proceedings of the ACM SIGCOMM Demo, 2009.

Wiseman et al., A Remotely Accessible Network Processor-Based Router for Network Experimentation, Proceedings of the 4th ACM/IEEE ANCS, pp. 20-29, 2008.

* cited by examiner

APPARATUS, METHOD, MANUFACTURE, AND SYSTEM FOR PROVIDING NETWORK SERVICES FROM BUILDING BLOCKS

STATEMENT REGARDING FEDERALLY SPONSORED RESEARCH AND DEVELOPMENT

This invention was made with government support under Grant Number CNS-0831912 awarded by the United States National Science Foundation (NSF). The United States Government has certain rights in the invention.

TECHNICAL FIELD

The present invention relates generally to computer networks, and in particular but not exclusively, to an apparatus, method, system, and manufacture for providing end-to-end services from reusable, modular building blocks with network-level support.

BACKGROUND

Ossification of the Internet is a widely accepted phenomenon that deters innovation in, and evolution of, the Internet. Many aspects of the Internet are now essentially unchangeable, preventing the Internet from evolving from its current state. Internet end points such as servers can be changed to implement new functionality, but not intermediate network nodes such as routers. Overlay networking was adopted to temporarily circumvent functionality limitations of the current Internet, while bringing in some performance issues caused by their in-scalability, cross-layer interaction, and function duplication. Several research efforts have been proposed to address these issues at an architectural level. However, there appears to be no clear vision of how individual features could fit together to allow the Internet to properly evolve.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, in which.

DETAILED DESCRIPTION

Figure 1:
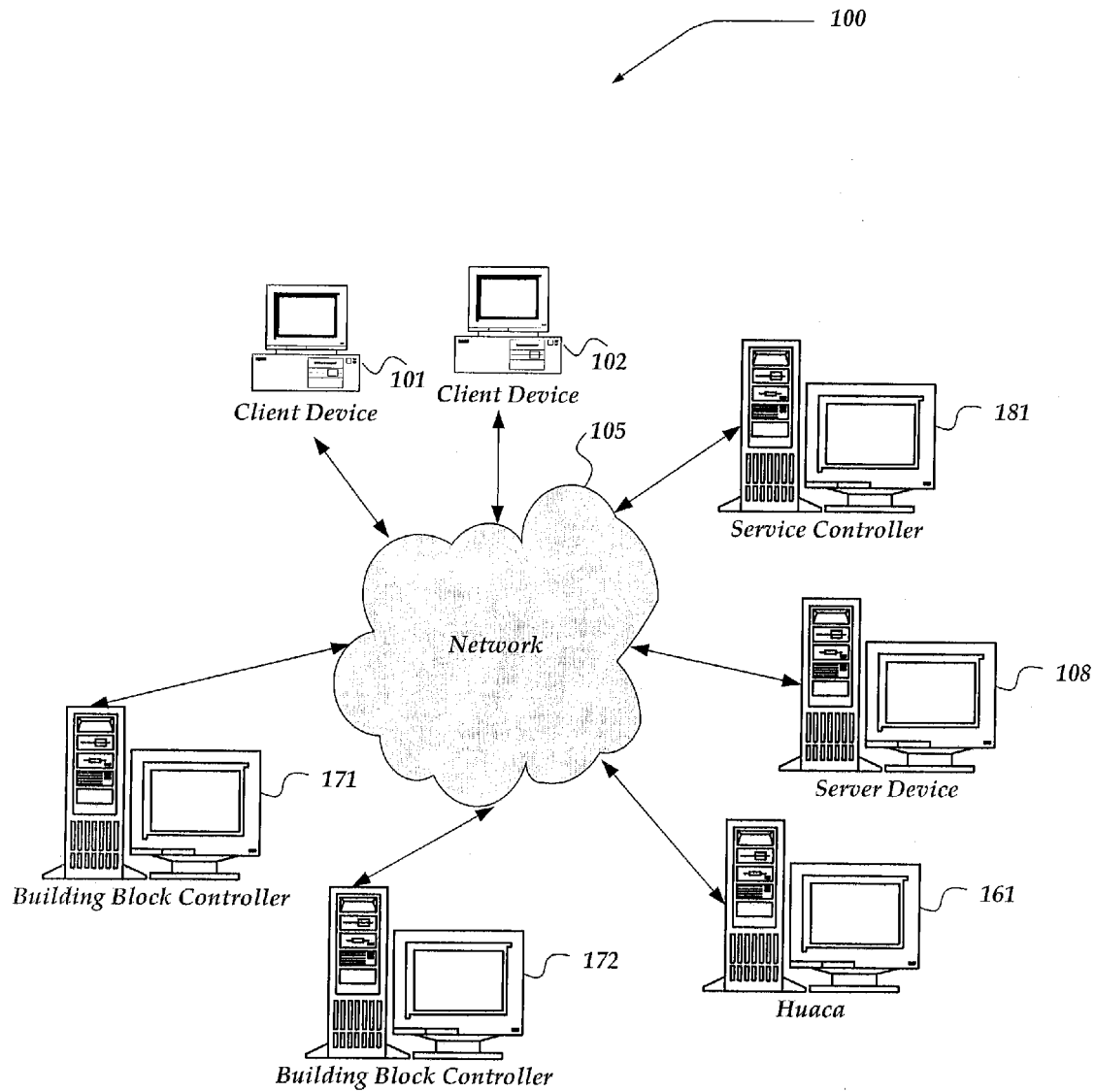
FIG. 1 shows a block diagram of an embodiment of a system for communicating over a network.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, a method and apparatus for communicating over a network is provided. The method includes obtaining building block codes, where the building blocks codes are capable of being used together to provide an end-to-end service. The building block codes are sent to each appropriate building block controller, where each building block controller is associated with a corresponding network node. Upon receiving a first packet of a connection for the first end-to-end service, a determination as to which network nodes of the plurality of network nodes should be used as network hops for the connection, and as to, for each network node that should be used as a network hop for the connection, which building block codes should be used by the building block controller corresponding to the network node. These determinations are communicated to each of the appropriate building block controllers.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes network 105, client device 101, client device 102, Huaca 161, building block controllers 171 and 172, service controller 181, and server device 108.

One embodiment of a network device is described in more detail below in conjunction with FIG. 2.

Client device 101 may include virtually any computing device that typically connects using a wired or wireless communications medium such as personal computers, multiprocessor systems, microprocessor-based or programmable consumer electronics, network PCs, or the like. In one embodiment, client device 101 may be configured to operate over a wired and/or a wireless network.

Generally, client device 101 may also include virtually any mobile computing device capable of receiving and sending communications over a network, such as a wired network, wireless network, or the like. Such devices include portable devices such as, cellular telephones, smart phones, pagers, radio frequency (RF) devices, infrared (IR) devices, Personal Digital Assistants (PDAs), handheld computers, laptop computers, wearable computers, tablet computers, integrated devices combining one or more of the preceding devices, or the like.

Client device 101 typically ranges widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send communications.

Client device 101 also may include at least one other client application that is configured to receive content from another computing device. The client application may include a capability to provide and receive textual content, multimedia information, or the like. The client application may further provide information that identifies itself, including a type, capability, name, or the like. In one embodiment, client device 101 may uniquely identify itself through any of a variety of mechanisms, including a phone number, Mobile Identification Number (MIN), an electronic serial number (ESN), network address, or other device identifier. The information may also indicate a content format that the client device is enabled to employ. Such information may be provided in a communication, or the like, sent to another computing device.

Client device 101 may also be configured to communicate through email, Short Message Service (SMS), Multimedia Message Service (MMS), instant messaging (IM), internet relay chat (IRC), Mardam-Bey's IRC (mIRC), Jabber, or the like, with and between another computing device. However, the present invention is not limited to these communication protocols, and virtually any other communication protocol may be employed.

Client device 102 may be substantially similar to client device 101. Although only two client device 101 is shown in FIG. 1, system 100 may only one client device, or may contain many client devices.

Network 105 connects each of the network devices shown in FIG. 1: client device 101, client device 102, Huaca 161, building block controllers 171 and 173, service controller 181, and server device 108. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Additionally, communication media typically embodies computer-readable instructions, data structures, program modules, or wired media such as twisted pair, coaxial cable, fiber optics, wave guides, and other wired media and wireless media such as acoustic, RF, infrared, and other wireless media.

Network 105 may include one or more wireless networks, which may include any of a variety of wireless sub-networks that may further overlay stand-alone ad-hoc networks, or the like, to provide an infrastructure-oriented connection for client devices. Such sub-networks may include mesh networks, Wireless LAN (WLAN) networks, cellular networks, or the like. A wireless network may further include an autonomous system of terminals, gateways, routers, or the like connected by wireless radio links, or the like. These connectors may be configured to move freely and randomly and organize themselves arbitrarily, such that the topology of the wireless network may change rapidly.

A wireless network may further employ a plurality of access technologies including 2nd (2G), 3rd (3G) generation radio access for cellular systems, WLAN, Wireless Router (WR) mesh, or the like. Access technologies such as 2G, 3G, and future access networks may enable wide area coverage for client devices, with various degrees of mobility. For example, the wireless network may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like.

Server device 108 is part of an Internet Service Provider (ISP) that offers customers, such as client device 101, access to network 105, as well as possibly other services.

Huaca 161 is a network device that serves as a store of network building blocks, and also acts as a directory to the network building blocks. Service controller 181 is a network device that is arranged to control end-to-end network services, for example between client devices such as client device 101 and client device 102, or between a client and a server such as client device 101 and server device 108. Service controller 181 is arranged to obtain building blocks of the end-to-end service in communication with a Huaca such as Huaca 161. Building block controller 171 and building block controller 172 are network devices which are each associated with a particular network node in network 105. Network nodes may include network switches, routers, and/or the like. Building block controllers such as building block controller 171 and 172 control the end-to-end services at each network hop in communication with service controller 181.

Illustrative Network Device

Figure 2:
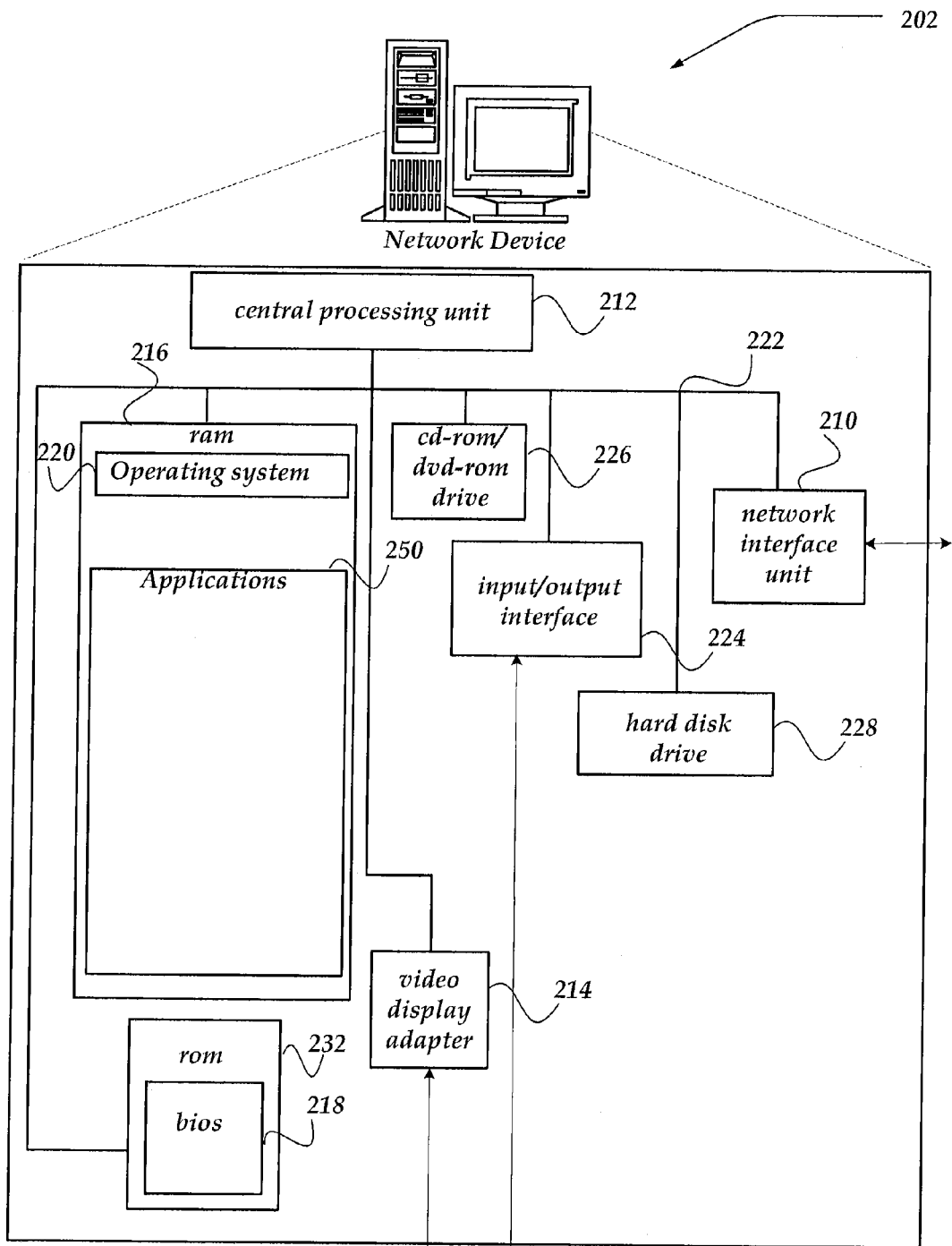
FIG. 2 illustrates a block diagram of one embodiment of a network device of FIG. 1.

FIG. 2 shows one embodiment of a network device, according to one embodiment of the invention. Network device 202 may include many more components than those shown. The components shown, however, are sufficient to disclose an illustrative embodiment for practicing the invention. Network device 202 may represent, for example client device 101, client device 102, Huaca 161, building block controllers 171 and 173, service controller 181, and/or server device 108 or FIG. 1.

Network device 202 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 202. Any general-purpose operating system may be employed. Basic input/output system ("BIOS") 218 is also provided for controlling the low-level operation of network device 202. As illustrated in FIG. 2, network device 202 also can communicate with the Internet, or some other communications network, via network interface unit 210, which is constructed for use with various communication protocols including the TCP/IP protocol. Network interface unit 210 is sometimes known as a transceiver, transceiving device, or network interface card (NIC).

The mass memory as described above illustrates another type of computer-readable media, namely computer readable storage media. Computer readable storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

RAM 216 may include one or more data stores, which can be utilized by network device 202 to store, among other things, applications 250 and/or other data. RAM 216 can also be used to store database information.

The mass memory also stores program code and data. One or more applications 250 are loaded into mass memory and run on operating system 220. Examples of application programs may include transcoders, schedulers, calendars, database programs, word processing programs, HTTP programs, customizable user interface programs, IPSec applications, encryption programs, security programs, web servers, account management, and so forth.

Illustrative Systems

Figure 3:
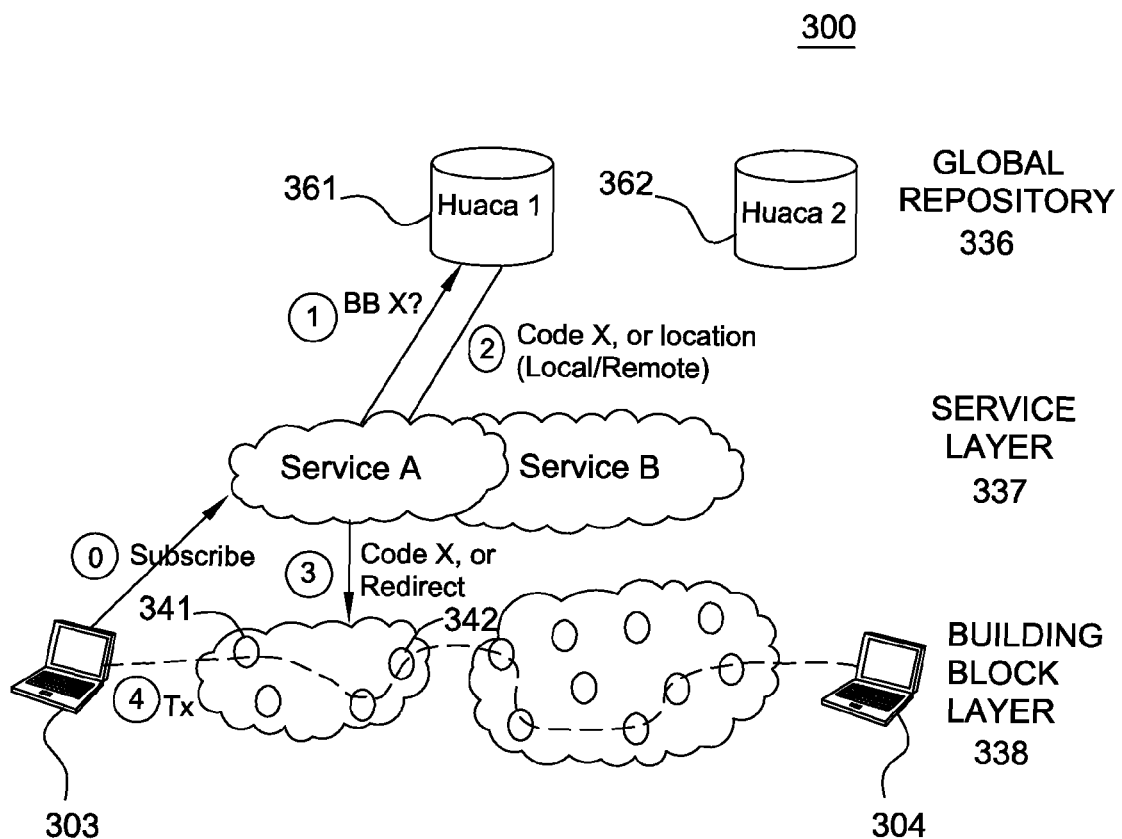
FIG. 3 shows a block diagram of an embodiment of the system of FIG. 1.

FIG. 3 illustrates a block diagram of system 300, which is one embodiment of the system 100 of FIG. 1. System 300 includes global repository 336, service layer 337, and building block layer 338. Global repository 336 includes Huacas such as Huaca 361 and Huaca 362. Services layer 337 includes services such as Service A and Service B. As discussed in greater detail below, each of the services may be controlled by a separate service controller such as service controller 181 of FIG. 1. Building block layer 338 includes network devices such as network device 303 and network device 304, and network nodes such as network nodes 341 and 342.

Each Huaca (e.g. Huaca 361 and 362) is a store of network building blocks. Each Huaca (e.g. Huaca 361 and 362) is arranged to enable dynamic dissemination the code of network functions or its cached location, so as to compose services usable by end-users (such as network device 303 and network device 304). Some end-to-end services are performed between, for example, network device 303 and network device 304. Network device 303 may be a client device (such as client device 101 of FIG. 1), a server device (such as server device 108 of FIG. 1), or the like. Network device 304 may be a client device (such as client device 102 of FIG. 1), a server device (such as server device 108 of FIG. 1), or the like. For some end-to-end services, a user must be subscribed to the service, as discussed in greater detail below. After a user is subscribed to a service, packets are transmitted from the user's device, such as network device 303, to network nodes on the network such as network node 341. Service layer 337 controls the end-to-end service, which occurs over network hops between network nodes (such as network nodes 341 and 342).

Each end-to-end service is designed using a string of reusable building blocks. These building blocks are key components that implement a well-defined set of functions. Various building blocks can each either simply provide an interface to a lower-level network resource or contain the implementation of a function that is useful to one or more network services. ISPs that wish to provide network support for a service can deploy the corresponding building block at appropriate locations in their network. For instance, current best-effort routing could be reconstructed as a series of building blocks such address translation, packet en/decapsulation, topology discovery, decision-making, and routing table building blocks. New functions can be formed, some of which may reuse existing building blocks, and some of which use new building blocks. The research community may innovate and propose new building blocks when necessary. Virtual network (service) operators and infrastructure providers (ISPs in traditional terms) are able to use system 300 to procure and install functions on-demand, for customized handling of certain traffic.

The Huacas (e.g., Huaca 361 and 362) store the network building blocks. Researchers and other third-parties may pool together existing building blocks to form the Huacas, which helps streamline the design of future building blocks.

System 300 enables a service-centric Internet in the future that is capable of dynamically composing and offering services to end-users. As previously discussed, this is effectively achieved by breaking up the functions that a service needs into building blocks, each of which encapsulates a specific network resource or a network function, provides tunable knobs for easy configurability, and can be virtualized to support multiple instances of the block. Each building block resides in one Huaca (e.g., Huaca 361 or Huaca 362) and the end-user flow pertaining to the service using the block is routed through this block, where each building block is addressable and reachable.

Each end-to-end service is a string of building blocks from the source to destination. In some embodiments, one service can invoke another, thereby organizing network functions in a multi-layered manner with level maintaining independent state. Adopting this building block-based architecture makes it easier to dynamically compose new services and to provide network-level support to existing services, thereby making the future Internet evolvable.

Global repository 336 provides pluggable building blocks that archive the actual code of the building block and the location of all running instances of the block. By querying each repository (i.e., Huaca) in global repository 336, service layer 337 obtains the elements necessary to compose services.

Service layer 337 is primarily responsible for putting together the end-to-end service and provisioning the route of flows pertaining to each service. By incurring a small flow setup time, system 300 provides considerable support for evolvability and innovation in the Internet. In some embodiments, a Huaca (e.g., Huaca 361 or 362) by itself can be operated by a third-party.

The building blocks can be classified based on their functionality. For instance, blocks that assist in building the basic routing service can be categorized as core building blocks. These blocks are typically provided by the infrastructure provider themselves. On the other hand, it is possible to have optional building blocks which provide a specific, although non-essential functionality. For instance, a block that prioritizes a certain kind of traffic over others or provides some other desired QoS guarantees could be addressed under this category.

There are two ways of instantiating a building block: a) Creating another running copy of the block, b) Creating a new virtual interface to a previously running block. The exact choice for each block depends on the factors of weight and level. The factor of weight is the question of how much overhead the block introduces. This determination decides if it makes sense to have several independent instances of the building block, or just one instance with virtual interface e.g., it may be efficient to have only one instance of a link verification block, while having multiple instances of a packet encryption block. The factor of level is the question of who will use the instance. Based on whether the user, service provider or the infrastructure provider is using the block, new instances can be created or existing instances can be reused, i.e., a block independently owned by each service is individually instantiated (physical or virtual depending on the weight) for that service.

In some embodiments, the building blocks can be developed by different parties—third party developers, freelancers, the infrastructure providers, or even end-users—with varying incentives. In some embodiments, each Huaca will allow these parties to register their building block libraries, developed in a standardized coding infrastructure, or their location, in the event the developer wishes to closely regulate instances of their building block. On registration, a unique identifier is assigned to each block and listed in a searchable index.

In some embodiments, all the running instances of a building block are registered in the Building Block Registry (BBR) of the corresponding Huaca (e.g., Huaca 361 and 362), indexed by the unique identifier of the block. This allows the Huaca (e.g., Huaca 361 and 362) to locate and identify the building blocks. The end-users and service providers can possibly browse through this database to discover interesting building blocks and their documentation.

An example of a user subscribed to an end-to-end service is shown in FIG. 3. First, the user of network device 303 attempts to subscribe to an end-to-end service, such as Service A. If service layer 337 provides the service but does not have the all of the network building blocks for performing service A for network device 303, service A queries Huaca 361 for the building block. Huaca 361 returns either the requested code, or the location (local or remote) of the building block. Service A then provides the code to building block layer 338, or redirects to the location of the building block code provided by Huaca 361.

The building blocks in Huaca 361 are available for purchase in some cases, possibly by the end user, by ISPs, and/or by intermediate service providers. Ultimately, entities owning the physical network components used would participate and give permission to run building blocks to be used in the services.

Figure 4:
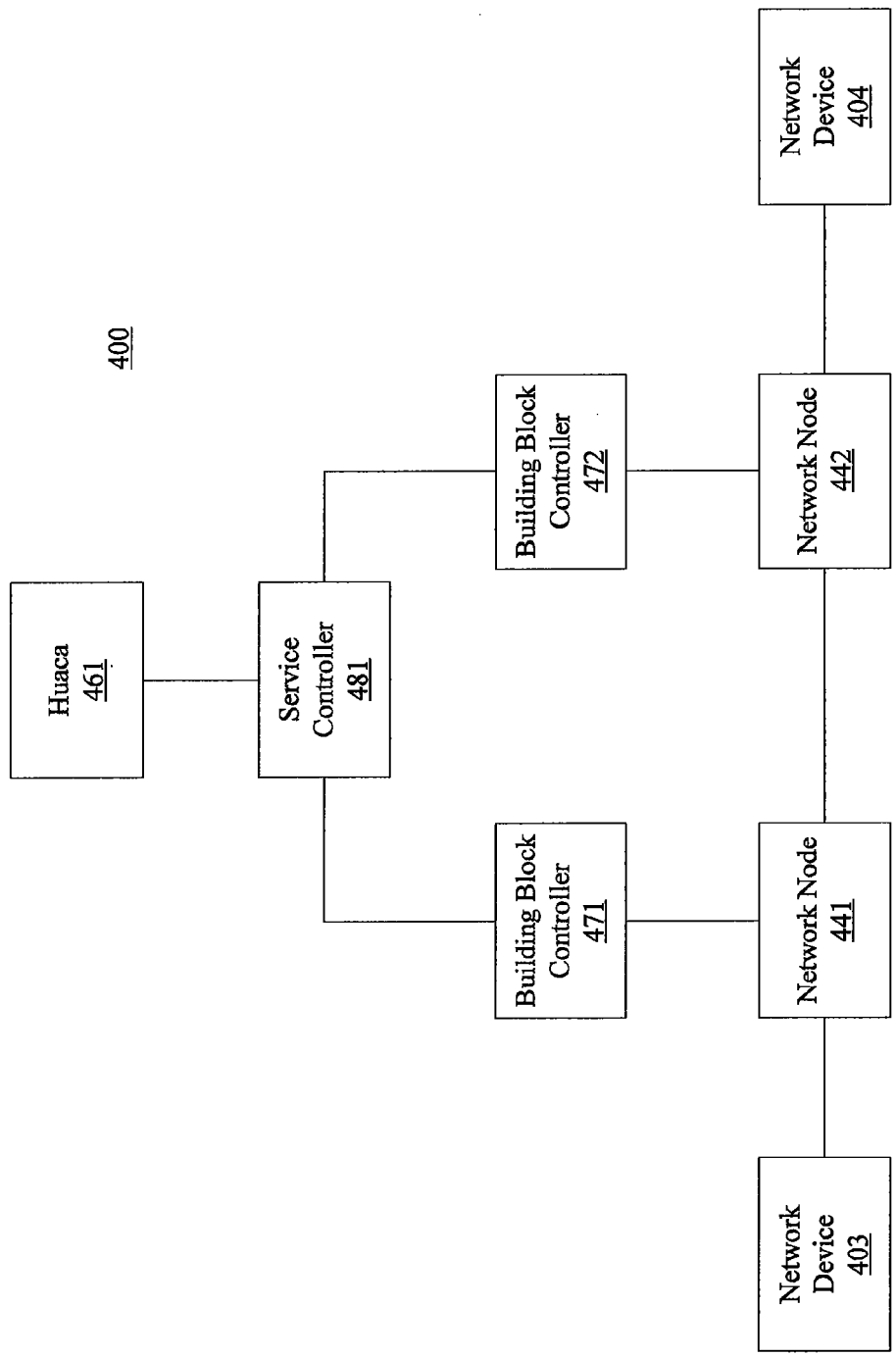
FIG. 4 illustrates a block diagram of another embodiment of the system of FIG. 1.

FIG. 4 illustrates an embodiment of system 400, which may be employed as an embodiment of system 100 of FIG. 1. System 400 includes network devices 403 and 404, network nodes 441 and 442, building blocks controllers 471 and 472, service controller 481, and Huaca 461.

Huaca 461 is arranged to store a directory to a plurality of building block codes, and further arranged to provide access to building block codes. Each of the building block controllers, including building block controller 471 and building block controller 472, is associated with a corresponding network node. For example, building block controller 471 is associated is associated with network node 441, and building block controller 472 is associated with network node 442. In some embodiments, each building block controller is software running on the network node with which it is associated. In other embodiments, each building block controller is software running on a separate network device from the network node with which it is associated, and is in communication with the network node with which it is associated over the network.

Service controller 481 is arranged to communicate with Huaca 461 to obtain a set of one or more building block codes. For example, service controller 481 may obtain a building block code for each building block component of the end-to-end service that is controlled by service controller 481. The building blocks codes, operating together, provide the end-to-end service that service controller 481 controls.

Service controller 481 is arranged to send one or more building blocks codes to each building block controller (e.g., building block controllers 471 and 472) associated with any of the network nodes that will be used in the service controlled by service controller 481, as follows. After discovery of the block code, service controller 481 downloads the building block code from the Huaca and pushes it to the building block controllers (e.g., 471 and 472) of strategically selected middleboxes (e.g., network nodes 441 and 442). Service controller 481 then ensures the user traffic is loosely routed along these middleboxes (e.g., network nodes 441 and 442). In the event that Huaca 461 specifies a strict location (instead of code) for the building block, service controller 481 performs the necessary redirection to reach the location. As discussed in greater detail above, the two alternatives for placement—co-location and offloading—provide different trade-offs on robustness, overhead and packet processing capabilities. For placement, the blocks at each layer use topological information of that layer, without the need for cross-layer awareness; the service-level agreement between the end-user and the service provider, or the service provider and the infrastructure provider, may already specify constraints on the block placement.

Network device 403 may initiate a service by sending packets. The packets may have an end-to-end flow from network device 403 to network device 404. In some embodiments, the service is identified based on header fields. The first packet in a flow for a particular service travels from network device 403 to network node 441. In some embodiments, network node 441 includes a table. In some embodiments, network node 441 identifies a first packet of a new connection associated with a service based on a flow defined in header fields of the packet that is not contained on a flow table in network node 441. In this case, a copy of the packet is sent to service controller 481, as well as to building block controller 471 if not already present on network node 441.

Upon receiving the copy of the first packet of a connection for the end-to-end service, service controller 481 determines which network nodes should be used as network hops for the connection. Service controller 481 also determines, for each of these network hops, which building blocks should be used to the building block controller that corresponds to that network node. Service controller 481 is further arranged to communicate these determinations to each of the building block controllers that should be used as network hops for the communication. The building blocks controllers control the network hops of the flow determined by service controller 481 and perform the building block functions determined by service controller 481.

Some of the building block codes form quality of service (QoS) functions such as prioritization functions. For example, for a 911 emergency service, building blocks associated with a particular quality of service for packets for that service are performed. However functions not associated with network routing or quality of service may also be performed. For example, a function such as video transcoding may be performed as one of the building blocks.

Service controller 481 determines which network hops are to be used for each connection, and determines which building blocks are to be used for the service at each determined hop. Building block controllers 471 and 472 determine the routing at each hop based on the flow determined by the service controllers, and perform the building blocks as requested by service controller 481. The service controller makes the determination when the first packet of the connection is initially sent to it. For the rest of the route of the first packet, as well as all of the remaining packets for the connection, the building blocks perform according to the instructions of service controller 481 based on the determination made after its receipt of the first packet of the connection.

Although one Huaca is shown in FIG. 4, in some embodiments, there may be many more additional Huacas, as previously discussed. Also, although only one service controller is shown in FIG. 4, there may be many more service controllers, one for each network service performed based on building blocks codes indexed by the Huacas. Further, although two building block controllers are shown in FIG. 4, there may be one building block controllers or many. In some embodiments, there is one building block controller for each network nodes which uses any of the end-to-end services controlled by one of the service controllers. Also, although two network devices are shown and the end-to-end service was discussed above as being a service from one network device to another, in other embodiments, the service may be sent from a network device back to the same network device, or many be a one-to-many or many-to-one communication such as a multicast, and/or the like.

Many services can be provided by system 400, and, as previously discussed, new services not yet contemplated can be provided in the future with system 400. One example of a service that could be provided by system 400 is a 911 service in which a device monitors the heart rate of a subject. If a certain condition is detected, a message could be sent to the subject's doctor over the Internet, or to the closest hospital. High quality is required due to a potential life-threatening nature of the condition. Another example is a gaming service over a network which requires good connection set up time with low delay. Another example service is an Internet connection that has a particularly high bandwidth at a very limited interval of time each day.

Many of these services discussed above are based on giving a better quality of service to the client under particular circumstances. However, as discussed above, functionality, including transformations of data can also be performed, such as video transcoding as previously discussed. The possible end-to-end services that may be performed by system 400 are virtually infinite, and are expandable and evolvable over time. System 400 provides an architecture by which it is relatively easy to create new services.

FIG. 4 shows certain functional interrelationships for which the actual physical devices may vary in different embodiments. For example, as previously discussed, each building block controllers may actually be software running on the corresponding network node, or may communicate with the network node over a network and operate as if it were on the network node, even though it is not on the network node. Also, various devices such as the service controllers and building blocks controllers are separate virtual devices, but some or all of them may be on the same physical device. For example, although there is a separate service controller for each service, all of the service controllers may in fact all be operating on the same device, such as a server with a separate TCP code for each separate service controller. Also, as previously discussed, if a building block is already running on a particular node, instead of creating a new building block, another virtual instance of the building block may be created instead. In some embodiments, as illustrated and discussed with regard to FIG. 6 in greater detail below, the OpenFlow protocol may be used to facilitate communication between the network nodes, the building block controllers, and the service controllers. However, the invention is not so limited, and other embodiments do not use the OpenFlow protocol. More information about the OpenFlow protocol can be found at the following references: NOX—An OpenFlow Controller. http://noxrepo.org; and N. McKeown et al. OpenFlow: enabling innovation in campus networks. Proceedings of the ACM Computer Communications Review, 38(2):69-74, April 2008.

Figure 5:
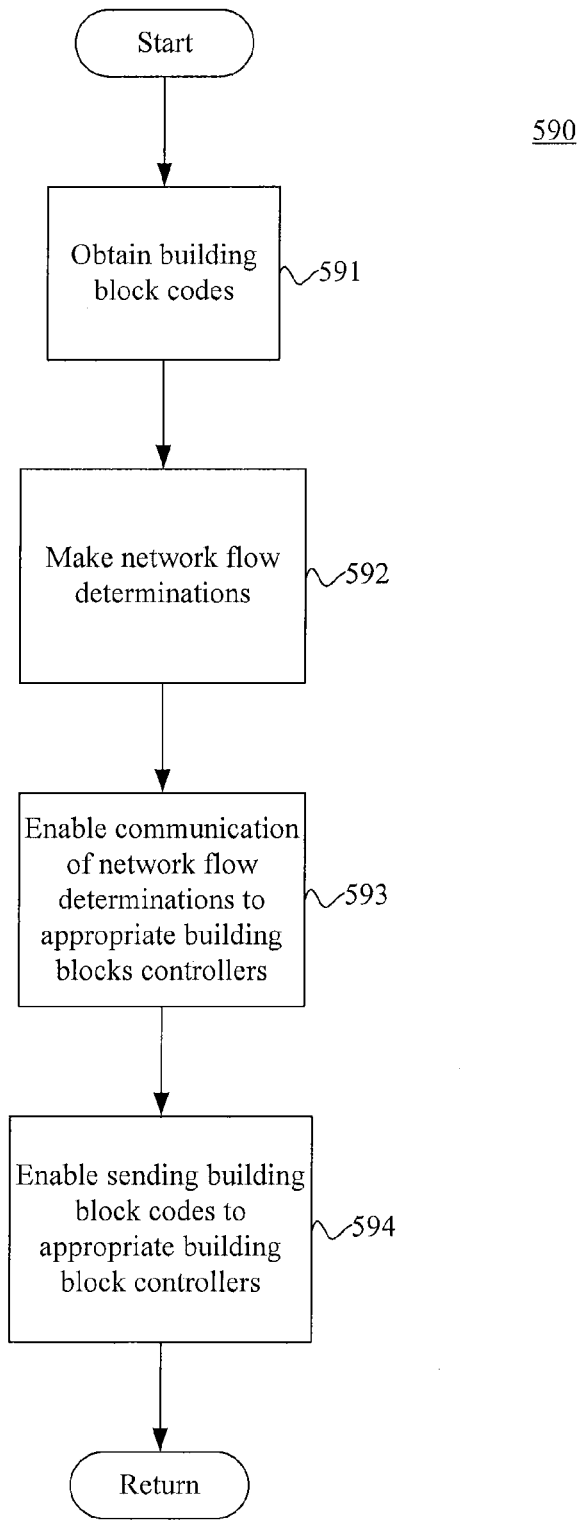
FIG. 5 shows a flow chart of an embodiment of a method that may be employed by the system of FIG. 4.

FIG. 5 shows a flow chart of an embodiment of a method (590) that may be employed by an embodiment of service controller 481 of FIG. 4. After a start block, the process proceeds to block 591, where building block codes are obtained. As previously discussed, the building blocks codes may be obtained in communication with one or more Huacas. The process then advances to block 592, where a network flow determination is made. As previously discussed, the network flow determination may include a determination to identify which network nodes of the plurality of network nodes should be used as network hops for the connection; and, for each network node that should be used as a network hop for the connection, which building block codes should be used by the building block controller corresponding to the network node. The process then moves to block 693, where communication of the network flow determinations to the appropriate building block controllers is enabled. The process then advances to block 594, where the sending building block codes to the appropriate building block controllers is enabled. The process then proceeds to a return block, where other processing is resumed.

Figure 6:
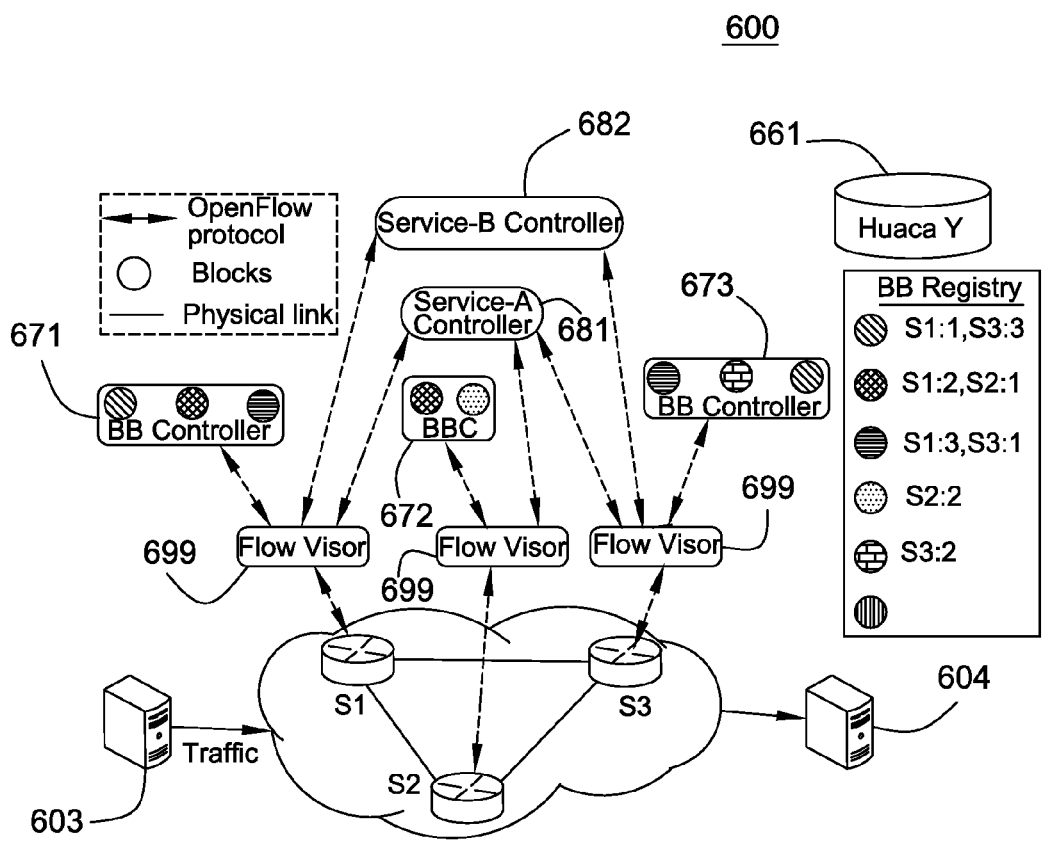
FIG. 6 illustrates an embodiment of the system of FIG. 4, arranged in accordance with aspects of the present invention.

FIG. 6 illustrates an embodiment of system 600, which may be employed as an embodiment of system 400 of FIG. 4. System 600 includes network devices 603 and 604; network switches S1, S2, and S3; FlowVisors 699; Huaca 661; building blocks controllers 671, 672, and 673; and service controllers 681 and 682. Network switches S1, S2, and S3 are embodiments of the network nodes (e.g. 441 and 442) of FIG. 4.

OpenFlow is an architecture for programming network devices in a dynamic and vendor-independent manner. The OpenFlow architecture outsources routing decisions to a controller application running on commodity computers, while leaving the flow-based packet switching in the fastpath hardware of the middleboxes. The OpenFlow-enabled middleboxes communicate with the controller, using the OpenFlow protocol, on receipt of the first packet of a flow without matching entries in the flowtable. The controller returns the necessary action to be performed on packets of this flow. A flow is defined by header fields in the data link layer, network layer and transport layer. Accordingly, OpenFlow provides layer-less dynamic control of flow switching actions.

An OpenFlow architecture is further enabled by means of a specialized controller, called FlowVisor, which isolates control of flows belonging to different services based on certain flow-matching criteria. In a scenario where there are multiple controllers, each being interested in a certain subset of the flows in the network, the FlowVisor provides the demultiplexing of OpenFlow control messages. By acting as both a controller and a switch, the FlowVisor transparently virtualizes the control of the network. This function makes it an important component of service design. Typically, there is one FlowVisor per domain of control.

Using FlowVisors 699 in system 600 allows having several levels of control, with each level being able to control a certain sub-population of flows. Each FlowVisor 699 is arranged to create guest controller entries in its memory such that there are two levels of controlling the flows in the substrate: 1) Building block control, 2) Service-level end-to-end control. These two different OpenFlow-controllers are built over the OpenFlow controller, which by itself is modular in nature. The FlowVisor ensures that the building block controller (BBC) (e.g., 671-673) handles necessary housekeeping and packet processing in the network, and the service controller (SC) (e.g., 681 and 682) manages the desired end-to-end routing function.

Each SC (e.g., 681, 682) downloads the building block from Huaca 661 and installs it on a particular middlebox (e.g., network switches S1, S2, and S3). The particular instance is, then, addressed by the unique identifier of the switch, and the identifier (a TCP port number in some embodiments) of the communication channel between BBC and the SC. The service updates the BBR with the new instance of a type of building block, for future reuse.

As shown in the embodiment illustrated in FIG. 6, there can be one or more FlowVisors 699 isolating control and allowing the two types of controllers (viz., building block and service) to see different sets of packet forwarding events. In some embodiments, one FlowVisor 699 is run per administrative domain. For clarity, FIG. 5 illustrates dedicated FlowVisors 699 for each network switch (e.g., S1, S2, and S3).

Each SC (e.g., 681, 682) receives communication about all packet-in events from the underlying switches (e.g., S1-S3) in its virtual network and returns appropriate flow actions to the switch (e.g., S1-S3). Thus, the SC (e.g., 681, 682) achieves the desired end-to-end service by routing traffic accordingly. In the event that there is no end-to-end support for OpenFlow, the SC (e.g., 681, 682) can still manage flows by routing traffic from OpenFlow island to the next. Although OpenFlow is currently limited to only forwarding primitives, some embodiments of system 600 extend forwarding to all types of packet handling.

Building block instances can be created by the service provider or the infrastructure provider, and at times by the end-user in coordination with the infrastructure provider (so as to customize her specific flows). As mentioned above, depending on who owns the block and the privileges associated, the controller for that level either creates a new instance with the code from Huaca 661 or another virtual instance using the location information in the Huaca 661. In either case, each installed building block provides an API for registering new higher level services. On registering, the service controller (e.g., 681, 682) obtains a unique communication channel to that instance.

To reduce single points of failure and service interruption, in some embodiments, some critical blocks are replicated across multiple middleboxes (e.g., network switches S1, S2, and S3) and share state among them. This redundancy also provides increased flexibility in choosing routes of each flow. In the event of a middlebox failure, the service controller (e.g., 681, 682) can locate other instances of the disrupted building block and reroute traffic accordingly.

Huacas (e.g., 661) represent a significant potential for a thriving market with sufficient incentive for operating a Huaca. There can be substantial revenue generated from royalty paid by users, service providers or infrastructure providers who procure building blocks. In some embodiments, the building block store may also offer a "trial" period for a pre-download of building blocks, during which the effectiveness of the blocks can be metered and the exact placement/parameters can be fine tuned. At other levels, the service provider can implement accounting and billing to appropriately charge for the value added service created from the purchased building blocks, and the infrastructure provider can charge for lease of the programmable middlebox (e.g., S1-S3). System 600 helps the infrastructure provider easily evolve their own network, thus providing sufficient incentive for all involved parties.

The above specification, examples, and data provide a complete description of the manufacture and use of the composition of the invention. Since many embodiments of the invention can be made without departing from the spirit and scope of the invention, the invention also resides in the claims hereinafter appended.

What is claimed is:

1. A network device for communicating over a network including a plurality of network nodes, each network node being associated with a building block controller, the network device comprising:
   a transceiver configured to communicate over the network; and
   a processor configured to execute the following steps:
   receiving, by the transceiver, a request to configure a first packet-based end-to-end service;
   identifying a set of one or more building block codes for performing the first packet-based end-to-end service;
   determining a network flow upon the transceiver receiving a first packet of a connection of the first end-to-end service, the network flow determination including:
   selecting network nodes of the plurality of network nodes for use as network hops for the connection; and
   identifying building block codes of the set of one of more building block codes to be used by each building block controller associated with each selected network node;
   communicating, by the transceiver, the network flow determination to the building block controller associated with the identified network node;
   determining whether the building block controllers corresponding to the selected network nodes already have the identified building block codes; and
   in response to determining that a building block controller does not have an identified building block code, obtaining, by the transceiver, the identified building block code and sending, by the transceiver, the identified building block code to the building block controller determined as not having the identified building block code.

2. The network device of claim 1, wherein at least one of the building block codes of the set of one or more building block codes obtained by the transceiver is requested from a repository and received from the repository.

3. The network device of claim 1, wherein at least one of the building block codes of the set of one or more building block codes obtained by the transceiver is a new virtual interface to an existing building block code.

4. The network device of claim 1, wherein at least one of the building block codes of the set of one or more building block codes is a quality of service function.

5. A method for communicating over a network including a plurality of network nodes, each network node being associated with a building block controller, the method comprising:
    receiving, by the transceiver, a request to configure a first packet-based end-to-end service;
    identifying a set of one or more building block codes for performing the first packet-based end-to-end service;
    determining a network flow upon receiving a first packet of a connection of the first end-to-end service, the network flow determination including:
        selecting network nodes of the plurality of network nodes for use as network hops for the connection; and
        identifying building block codes of the set of one of more building block codes to be used by each building block controller associated with each selected network node;
    communicating the network flow determination to the building block controller associated with the identified network node;
    determining whether the building block controllers corresponding to the selected network nodes already have the identified building block codes; and
    in response to determining that a building block controller does not have an identified building block code, obtaining, by the transceiver, the identified building block code and sending, by the transceiver, the identified building block code to the building block controller determined as not having the identified building block code.

6. The method of claim 5, wherein at least one of the building block codes of the set of one or more building block codes obtained by the transceiver is requested from a repository and received from the repository.

7. The method of claim 5, wherein at least one of the building block codes of the set of one or more building block codes obtained by the transceiver is a new virtual interface to an existing building block code.

8. An article of manufacture including a non-transitory processor-readable medium having processor-executable code encoded therein, which when executed by one or more processors, enables actions for communicating over a network including a plurality of network nodes each associated with a building block controller of a plurality of building block controllers, the actions comprising:
    receiving a request to configure a first packet-based end-to-end service;
    identifying a set of one or more building block codes for performing the first packet-based end-to-end service;
    determining a network flow upon receiving a first packet of a connection of the first end-to-end service, the network flow determination including:
        selecting network nodes of the plurality of network nodes for use as network hops for the connection; and
        identifying building block codes of the set of one of more building block codes to be used by each building block controller associated with each selected network node;
    communicating the network flow determination to the building block controller associated with the identified network node;
    determining whether the building block controllers corresponding to the selected network nodes already have the identified building block codes; and
    in response to determining that a building block controller does not have an identified building block code, obtaining the identified building block code and sending the identified building block code to the building block controller determined as not having the identified building block code.

9. The article of manufacture of claim 8, wherein at least one of the building block codes of the set of one or more building block codes obtained by the transceiver is requested from a repository and received from the repository.

10. The article of manufacture of claim 8, wherein at least one of the building block codes of the set of one or more building block codes obtained by the transceiver is a new virtual interface to an existing building block code.

11. The article of manufacture of claim 8, wherein at least one of the building block codes of the set of one or more building block codes is a quality of service function.

12. A system for communicating over a network, comprising:
    a first repository including a directory to a plurality of building block codes and configured to provide access to each of the plurality of building block codes;
    a plurality of building block controllers, wherein each of the plurality of building block controllers is associated with a corresponding network node of a plurality of network nodes on the network;
    a first service controller, wherein the first service controller is configured to execute the following steps:
        receiving a request to configure a first packet-based end-to-end service;
        identifying a set of one or more building block codes for performing the first packet-based end-to-end service;
        determining a network flow upon receiving a first packet of a connection of the first end-to-end service, the network flow determination including:
            selecting network nodes of the plurality of network nodes for use as network hops for the connection; and
            identifying building block codes of the set of one of more building block codes to be used by each building block controller associated with each selected network node;
        communicating the network flow determination to the building block controller associated with the identified network node;
        determining whether the building block controllers corresponding to the selected network nodes already have the identified building block codes; and
        in response to determining that a building block controller does not have an identified building block code, obtaining the identified building block code and sending the identified building block code to the building block controller determined as not having the identified building block code.

13. The system of claim 12, wherein each of the building block controllers is configured to execute building block codes based on instructions of the network flow determination and route a first packet to another network node in accordance with the network flow determination.

14. The system of claim 12, wherein at least one of the building block codes of the set of one or more building block codes obtained by the first service controller is requested from the first repository and received from the first repository.

15. The system of claim 12, wherein at least one of the building block codes of the set of one or more building block codes obtained by the first service controller is a new virtual interface to an existing building block code.

16. The system of claim 12, wherein at least one of the building block codes of the set of one or more building block codes is a quality of service function.

17. The system of claim 12, wherein the first repository includes a registry of each of the plurality of building block codes, wherein the first service controller is configured to communicate with the first repository to register each building block code of the set of one or more building block codes, and wherein the first repository is configured to assign a unique identifier to each building block code of the plurality of building block codes and to list each building block code of the set of one or more building block codes in a searchable index.

18. The system of claim 12, further comprising: a second repository including a directory to another plurality of building block codes and configured to provide access to each building block code of the another plurality of building block codes.

19. The system of claim 12, further comprising: a second service controller that is arranged to control a second end-to-end service.

20. The system of claim 19, wherein at least one of the building blocks of the plurality of building block codes is arranged to invoke the second end-to-end service.

\* \* \* \* \*